United States Patent

Cucci et al.

[11] Patent Number: 5,230,248
[45] Date of Patent: Jul. 27, 1993

[54] CORROSION RESISTANT ISOLATOR

[75] Inventors: Gerald R. Cucci, Minneapolis; Steven M. Lemire, Chaska, both of Minn.

[73] Assignee: Rosemount Inc., Minneapolis, Minn.

[21] Appl. No.: 930,844

[22] Filed: Aug. 14, 1992

Related U.S. Application Data

[63] Continuation of Ser. No. 729,489, Jul. 12, 1991, Pat. No. 5,184,514.

[51] Int. Cl.⁵ .............................................. G01L 7/06
[52] U.S. Cl. ........................................ 73/706; 73/715; 73/756; 92/103 M
[58] Field of Search ................ 73/706, 715–728, 73/756, 278, 98 R; 92/103 M; 228/107, 108, 178, 101

[56] References Cited

U.S. PATENT DOCUMENTS

| | | | |
|---|---|---|---|
| 4,046,010 | 9/1977 | Akeley | 73/406 |
| 4,136,603 | 1/1979 | Doyle, Jr. | 73/278 |
| 4,370,890 | 2/1983 | Frick | 73/718 |
| 4,787,250 | 11/1988 | Varrese | 73/715 |
| 5,184,514 | 2/1993 | Cucci et al. | 73/706 |

Primary Examiner—Donald O. Woodiel
Attorney, Agent, or Firm—Kinney & Lange

[57] ABSTRACT

An isolator for use in pressure transmitters for isolating the process fluid being sensed from a sensor, comprises an isolating diaphragm that is thin, and made of a suitable corrosion resistant metal, such as tantalum, and which must be anchored to an isolator housing made of a substantially different metal such as stainless steel. Tantalum is very resistant to corrosion, and is a high melting point metal, which is substantially higher than the material comprising the sensor housing so direct welding is virtually impossible. The present invention relates to securing a support ring of the same metal as the diaphragm surrounding the cavity formed for the isolator fluid, preforming a thin metal diaphragm made of the selected material, and then welding the diaphragm and a ring overlying the diaphragm directly to the support ring. Using a support ring that is separately secured in place on the isolator body permits the welding temperature to be raised sufficiently for fastening the high melting point components (tantalum) together without damaging the sensor housing.

16 Claims, 2 Drawing Sheets

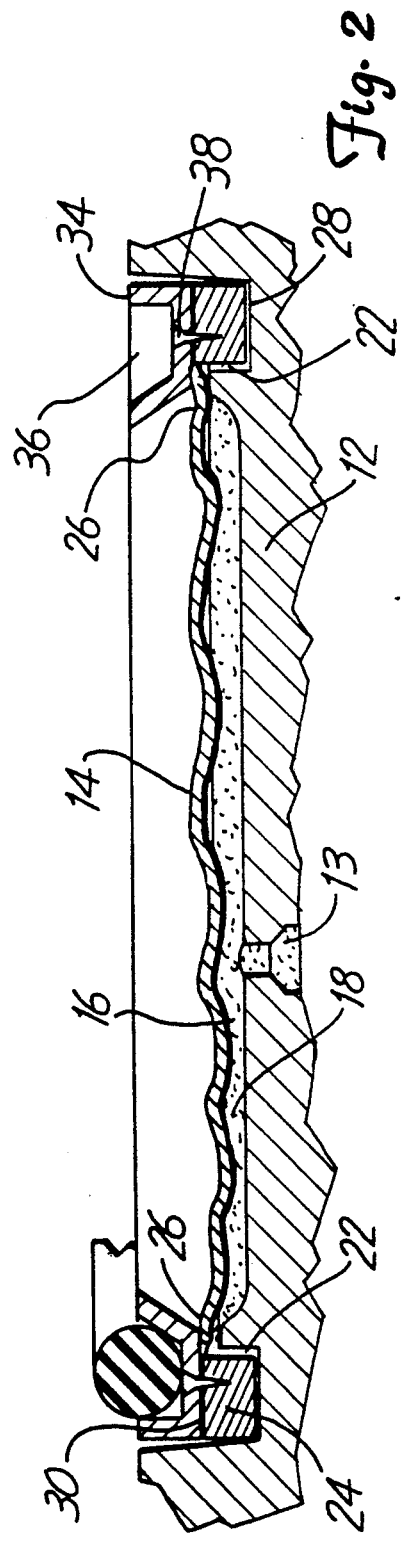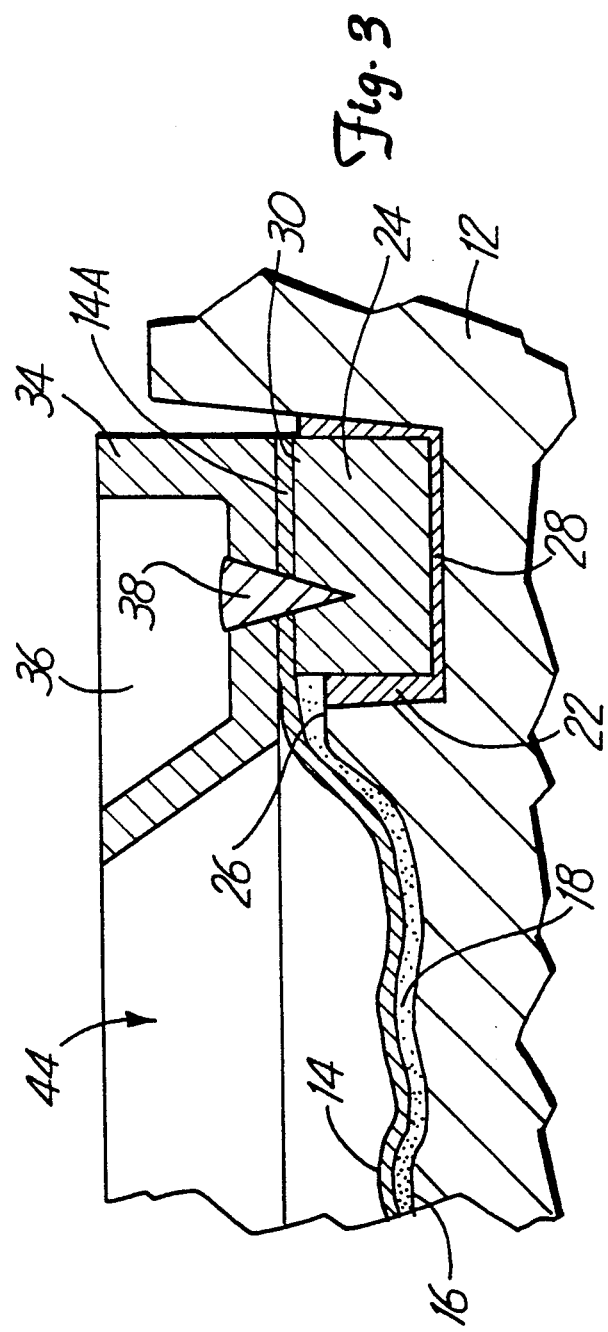

CORROSION RESISTANT ISOLATOR

This is a continuation of application Ser. No. 07/729,489, filed Jul. 12, 1991, now U.S. Pat. No. 5,184,514.

BACKGROUND OF THE INVENTION

The present invention relates to isolator diaphragms made of materials which must be anchored to an isolator housing formed of other materials which are incompatible with direct welding to the isolator diaphragm. A tantalum diaphragm, for example, has a very high melting point while a stainless steel isolator housing has a lower melting point and it is not practical to weld the two parts directly to one another.

Isolating diaphragms are used in pressure transmitters to couple pressure from process fluids outside the transmitter to an isolator fluid sealed inside the transmitter. The isolator fluid, in turn, couples the pressure to a pressure sensor. Process fluids, which can be highly corrosive, are thus kept isolated from the pressure sensor to avoid corrosion or damage to the pressure sensor.

Various corrosion resistant, high cost metals are used for the diaphragms. Tantalum is a material that is very resistant to corrosion, but it has a considerably higher melting point than other materials that are conventionally used for isolator diaphragms, such as 316 L stainless steel, Hastalloy C and Monel. The isolator housing mounting the isolating diaphragm may be made of various stainless steel alloys which have a much lower melting point than tantalum.

A welded joint around the rim of the isolator diaphragm is preferred, however, welding of a tantalum isolator diaphragm directly to the isolator housing isn't practical because the isolator housing melts at a much lower temperature than the tantalum isolator. The term "welding" means joining two metals parts together by applying heat to melt both metal parts near mating surfaces. Welding is thus distinguished from brazing in which at least one of the parts being joined does not melt significantly and there is a filler metal with a lower melting temperature introduced in the braze joint.

An isolator diaphragm can also be incompatible with direct welding to an isolator housing of other material because the weld contaminates the isolator diaphragm with the other metal from the housing. Dissimilar metals in the isolator diaphragm then contact the fluid and the corrosion resistance of the isolator diaphragm is reduced.

Prior systems are known for brazing support rings to tantalum isolators. But it is difficult to completely seal the braze joints from contact with the process fluid or its vapors. The braze joint is typically more prone to corrosion than a welded joint would be because of the presence of dissimilar metals in the braze joint. Even small amounts of corrosion can result in a leak because the isolator diaphragm must be kept relatively thin to reduce pressure drop when it is deflected.

There is thus a need for an arrangement which provides a weld to join an isolator diaphragm formed from a corrosion resistant metal such as tantalum to an isolator housing which is formed of other metal not compatible with welding to the isolator diaphragm metal.

SUMMARY OF THE INVENTION

The present invention relates to mounting and use of an isolator diaphragm made of corrosion resistant material, such as tantalum, onto an isolator body made of material that is incompatible with direct welding to the isolator diaphragm material, while providing a complete seal to prevent any seepage of corrosive material onto a sensor body. In order to accomplish the sealing, a continuous weld seals the periphery of the isolator diaphragm. In order to weld tantalum, or a similar material, a very high temperature is necessary. Thus, tantalum can be effectively welded only to tantalum or a material that has similar melting point. The present invention comprises a method of fastening a relatively heavy support ring of corrosion resistant metal such as tantalum to the isolator body preferably by brazing, surrounding the cavity used for the isolator diaphragm, then re-machining the support ring, if necessary, to the proper dimensions. The brazing will fasten the support ring adequately to the material used for the isolator body, and then the support ring is used as a base for welding the corrosion resistant diaphragm and an outer weld ring to the support ring. The weld ring, the diaphragm and the support ring are all fused together with a continuous, annular, leak proof seam weld without having to weld tantalum directly to the housing materials or use other techniques that may introduce other less corrosion resistant materials into the weld.

The weld ring is formed to support a compressible seal against which a standard coupling flange member can be placed for carrying the process fluid to the isolator diaphragm. The isolator diaphragm transfers the pressure to the sensor through an incompressible fluid filling.

Isolator diaphragms are formed into a corrugated shape by hydraulically pressing the diaphragm against a corrugated backing surface either before or after the diaphragm is installed on the transmitter body.

The method provides for a leak proof, corrosion resistant diaphragm that permits welding the isolator diaphragm using an outer weld ring with a leak-tight weld to a support ring formed of the same material as the isolator diaphragm installed on the isolator housing.

BRIEF DESCRIPTION OF THE DRAWINGS

FIG. 2 is a sectional view of a high melting point isolator diaphragm made according to the present invention mounted in a typical isolator body; and FIG. 3 is an enlarged fragmentary sectional view similar to FIG. 2 showing the welding and mounting arrangement for the high melting point diaphragm in detail.

DETAILED DESCRIPTION OF THE PREFERRED EMBODIMENTS

Figure 1:
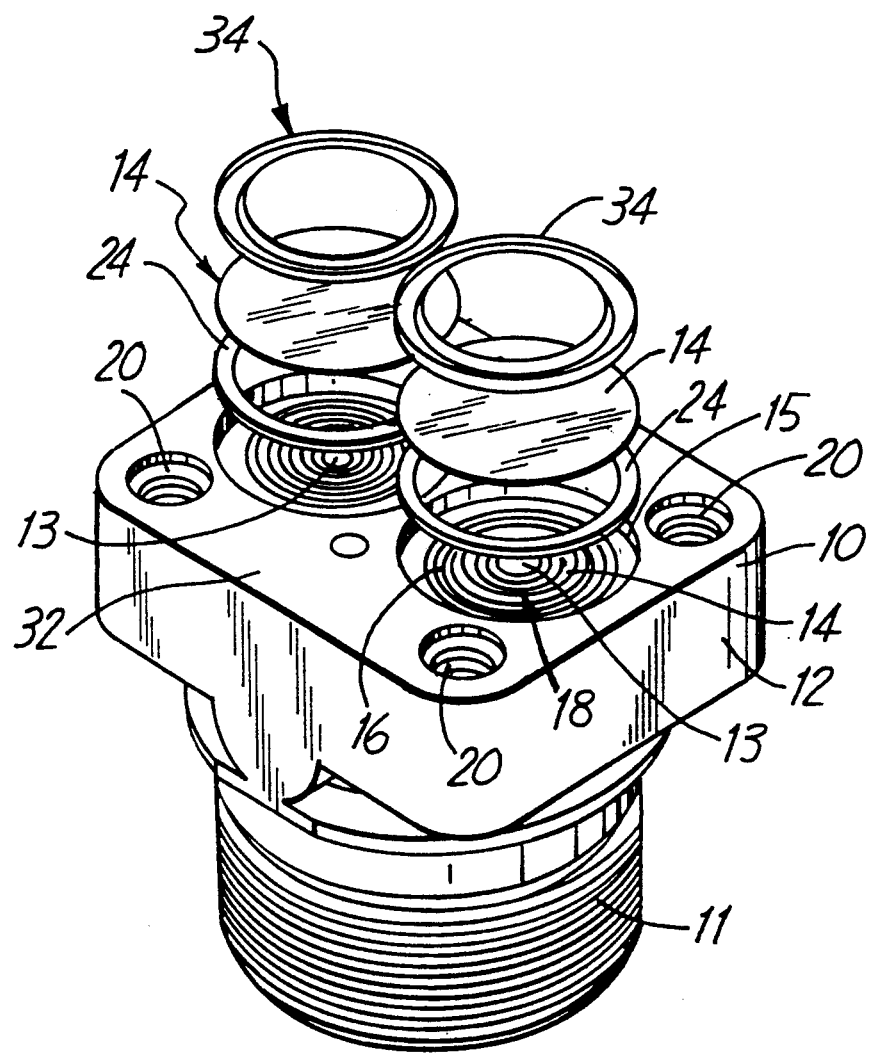
FIG. 1 is an exploded perspective view of a isolator housing module for a typical pressure transmitter showing the components used for mounting a high melting point isolator diaphragm therein.

Referring to FIG. 1, an isolator and pressure sensor assembly for a pressure transducer or sensor indicated generally at 10 is made to be attached through suitable threaded connections 11 to a pressure transmitter electronics housing (not shown). The isolator assembly 10 has a main body 12, and on the interior of the body are passageways such as that shown at 13 (FIG. 1 & 2) that lead to one or more pressure sensors within assembly 10. As shown in FIG. 1, there are two separate isolator diaphragms 14, one overlying each of a pair of cavities 15. The cavities 15 have corrugated or irregularly shaped lower surfaces 16 that define, in connection with an isolator diaphragm 14, an isolator chamber 18. Each isolator chamber is filled with a suitable non-corrosive or inert liquid such as a silicone oil.

Suitable bolt holes 20 are used for providing connections for a standard coupling flange, or other adapters that will be used for connecting pressure from a process fluid source to the isolator diaphragm, to apply pressure on the outwardly facing surface of the respective diaphragm. The isolator diaphragms are thin and flexible and may be called slack diaphragms. Generally, they are corrugated so they flex easily and provide little pressure drop when deflected by the applied pressure.

Where highly corrosive, and high temperature fluids are used, tantalum and similar high melting point, corrosive resistive materials can be selected for such diaphragms. Tantalum has a substantially higher melting point than the material from which the body 12 is made which may be, for example, type 316L stainless steel. As shown in FIG. 2, the body 12 is generally a cast body that is finish machined, and as shown, an annular groove 22 is formed around each of the chambers 18. This annular groove is made to receive a base support ring 24 made of tantalum or another high melting point material compatible with the diaphragm material. It can be seen that the base support ring 24 has an upper surface that extends above the edges shown at 26 of the chamber 18. This base support ring 24 can be brazed in place with suitable brazing indicated at 28 (FIGS. 2 & 3) that will completely seal the groove 22 and securely affix the base support ring 24 into the groove, and directly onto the material of the body 12.

Base support ring 24 then can be machined so that it is free of excess braze material and its upper surface 30 is at a desired planar position, and is properly oriented relative to the mounting surface indicated at 32 (FIG. 1) on which flange adapters are mounted for carrying the process fluid to the isolator diaphragms.

The base support ring 24 is secured to surround the chamber 18. Alternatively, the base support ring can be cast in place since the support ring is made of a substantially higher melting point material than body 12. The body 12 is cast with base support ring 24 in place and then machined at the same time as the bolt holes and other surfaces requiring machining are machined. The brazing that is indicated at 28 is a preferred form, but casting in place also can be used for securing the base ring 24 in its proper position.

Once the base ring 24 is secured into the body 12 and positioned surrounding the cavity 15, a tantalum diaphragm 14 (which can be corrugated) is placed onto the upper surface 30, and then, if desired, covered with a tantalum weld ring 34. The tantalum weld ring 34, as shown, has an annular recess or pocket 36 in which a suitable compressible pressure seal or O-ring can be placed and mounted for sealing against a flange or coupler mounted on the exterior surface 32 and bolted to carry the process fluid to the exterior surface of the tantalum isolator diaphragm 14.

In FIG. 3, the assembly of the base ring 24, a peripheral edge 14A of the diaphragm 14 supported on the surface 30 and the, weld ring 34 placed on top of the flange 14A can be welded with a weld 38 utilizing a welding process suitable for tantalum or other high melting point metals, because the metals being joined are all of the same or similar melting temperatures. Weld 38 is a ring-type annular weld providing a continuous fluid-tight seal between the base support ring 24, and the diaphragm flange portion 14A as well as with respect to the overlying weld ring 34. This will prevent any of the process fluid that enters into the process fluid chamber indicated at 44 that is formed by the weld ring 34 and the exterior surface of the diaphragm 14, from seeping past the diaphragm seal and onto the body 12, tending to corrode the material of the body 12. The weld 38 to the relatively thin diaphragm rim 14A is exposed to the process fluid in process fluid chamber 44, however, the weld and the parts it joins can all be formed of the same high temperature metal such as tantalum, so that galvanic action or corrosion due to dissimilar metals is avoided. The braze joint 28 is not in direct contact with the process fluid in chamber 44 which avoids corrosion. The ring 24 and body 12 which are joined by braze joint 28 are relatively thick so that the joint has a relatively long life before corrosion or galvanic action can cause a leak. Ring 24 can be sized to have enough thermal mass to avoid remelting the braze during the welding operation. The welding operation is done conventionally using laser or electron beam welding, for example, and inert cover gasses or a vacuum may be used to avoid contamination during the welding operation. Braze joint 28 preferably extends over the base and inside and outside diameters of ring 24 to provide security from corrosion for a long period of time.

In this way, tantalum and other high melting point isolator diaphragms can be mounted securely in a body of an isolator that is made of different, lower melting point materials, and yet can be welded in a manner that provides for a leak proof, corrosion resistant, continuous seam weld at the periphery of the isolator diaphragm. The invention can be used where there are compatibility problems between the material of the isolator diaphragm and the material of the isolator body. The compatibility problem can be a difference in melting point, as illustrated. The invention can also be applied where other differences between the metal of the diaphragm and the metal of the isolator body make direct welding impractical, such as when contamination of the isolator diaphragm with weld metal from the isolator body would contaminate the isolator diaphragm and reduce its corrosion resistance.

Although the present invention has been described with reference to preferred embodiments, workers skilled in the art will recognize that changes may be made in form and detail without departing from the spirit and scope of the invention.

What is claimed is:

1. A pressure isolator comprising a body made of a first metallic material defining a cavity, a thin flexible diaphragm made of a second metallic material not compatible with direct welding to the first metallic material, a one-piece support ring made entirely of the same material as the diaphragm mounted directly to said body surrounding an isolator opening, and an annular peripheral weld sealing and joining the support ring and the diaphragm together around the periphery of the diaphragm to provide a sealed cavity relative to the body and the isolator opening.

2. The pressure isolator of claim 1 wherein said support ring is brazed to the body.

3. The pressure isolator of claim 1 and a support surface on said body comprising an annular recess, and said support ring being fitted within said recess and brazed to the body.

4. The pressure isolator of claim 1 and an annular weld ring forming an annular cavity overlying the diaphragm, and being made of the same material as the diaphragm and the support ring, said weld ring having a base wall through which the annular peripheral weld passes, and said weld also passing through the diaphragm and into the support ring.

5. The pressure isolator as specified in claim 4 wherein the first metallic material has a melting temperature which is incompatible for direct welding with a melting temperature of the second metallic material.

6. The pressure isolator as specified in claim 5 wherein said support ring, said diaphragm and said weld ring are made of tantalum.

7. The pressure isolator of claim 1, wherein said support ring is sealingly engaged to the body along the periphery of the diaphragm.

8. A method of mounting a high melting point diaphragm onto a body of substantially lower melting point material defining a cavity comprising the steps of:
providing an isolator region on the body;
securing a one-piece ring made entirely of the same material as the diaphragm directly to the body surrounding the isolator region; and
welding the diaphragm to the support ring with a continuous annular fluid-tight weld.

9. The method of claim 8 including the further step of providing an overlying weld ring over the diaphragm on a side opposite the support ring, and welding through the weld ring, the diaphragm and into the support ring for providing the fluid-tight annular weld around the diaphragm to seal the diaphragm.

10. The method of claim 9 including the step of forming the diaphragm to a corrugated shape.

11. The method of claim 8 wherein said securing step comprising brazing the support ring to a support surface on the body.

12. The method of claim 8 includes the step of forming an annular groove on the body surrounding a depression defining the isolator region, and the securing step comprises brazing the support ring into the groove prior to welding the diaphragm to the support ring.

13. The method of claim 9 including the step of selecting the diaphragm, support ring and weld ring to be of tantalum.

14. The method of claim 13 including selecting the body material to be 316L Stainless Steel.

15. The method of claim 13 including selecting the body material to be 17–4 ph stainless steel.

16. The method of claim 8 and machining the support ring after securing the support ring to the body.

* * * * *